United States Patent [19]

Guerndt, Jr. et al.

[11] 4,302,922

[45] Dec. 1, 1981

[54] PRUNING BOOM

[75] Inventors: H. Fred Guerndt, Jr., Avon Park; Kenneth E. Thompson, Wauchula, both of Fla.

[73] Assignee: Orange Enterprises, Inc., Wauchula, Fla.

[21] Appl. No.: 166,236

[22] Filed: Jul. 7, 1980

[51] Int. Cl.³ .............................................. A01D 55/18
[52] U.S. Cl. ........................................ 56/235; 56/295
[58] Field of Search ................. 56/233, 234, 235, 236, 56/238, 255, 256, 295; 30/276, 379

[56] References Cited

U.S. PATENT DOCUMENTS

| | | | |
|---|---|---|---|
| 3,138,911 | 6/1964 | Pounds | 56/235 |
| 3,487,615 | 1/1970 | Leydig et al. | 56/235 |
| 3,913,304 | 10/1975 | Jodoin | 56/235 |
| 4,019,308 | 4/1977 | Quick | 56/295 |

FOREIGN PATENT DOCUMENTS 244782  3/1969  U.S.S.R. ............................... 56/235

OTHER PUBLICATIONS

Paul Moore, "Pruning Machines for Citrus", 12-1957, vol. 43, No. 2, California Citrograph.

Primary Examiner—Robert A. Hafer
Attorney, Agent, or Firm—Benjamin P. Reese, II

[57] ABSTRACT

A pruning boom for pruning or trimming trees, bushes, shrubs and the like. A plurality of circular saw blades are rotatably mounted on a saw carrying member. Each saw blade is positioned for rotation in a spatial plane which intersects the spatial plane containing the surface of the saw carrying member located immediately behind the saw blades at an identical non-perpendicular angle. In the preferred embodiment of the present invention, one pruning boom is mounted on each side of the front-end of an agricultural vehicle to construct a machine for pruning parallel rows of citrus trees. During such pruning operations, the angular relationship between the rotating saw blades and the saw carrying member prevents newly cut branches and limbs from wedging in the space between the saw blades and the saw carrying member. The saw blades are overlapped at their peripheries with the uppermost portion of each saw blade positioned behind the lowermost portion of the adjacent saw blade above it on the saw carrying member.

8 Claims, 4 Drawing Figures

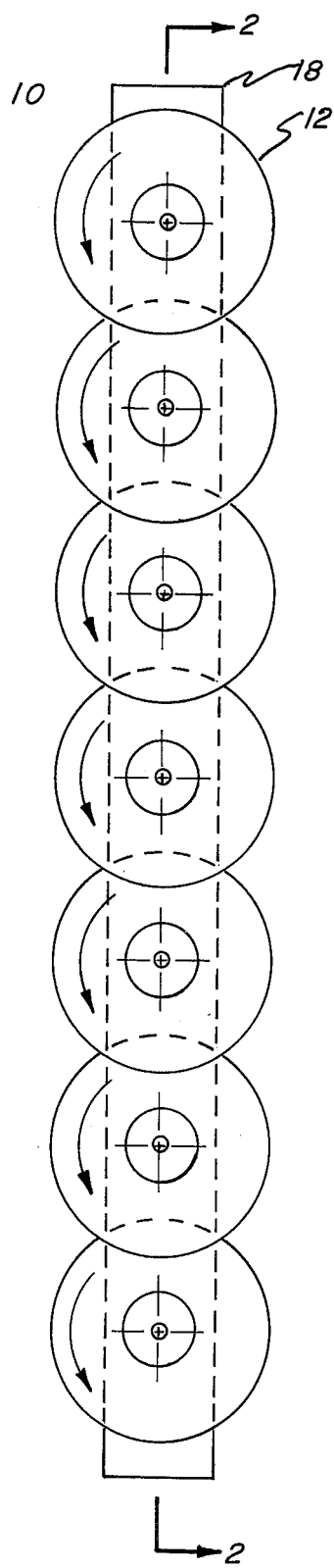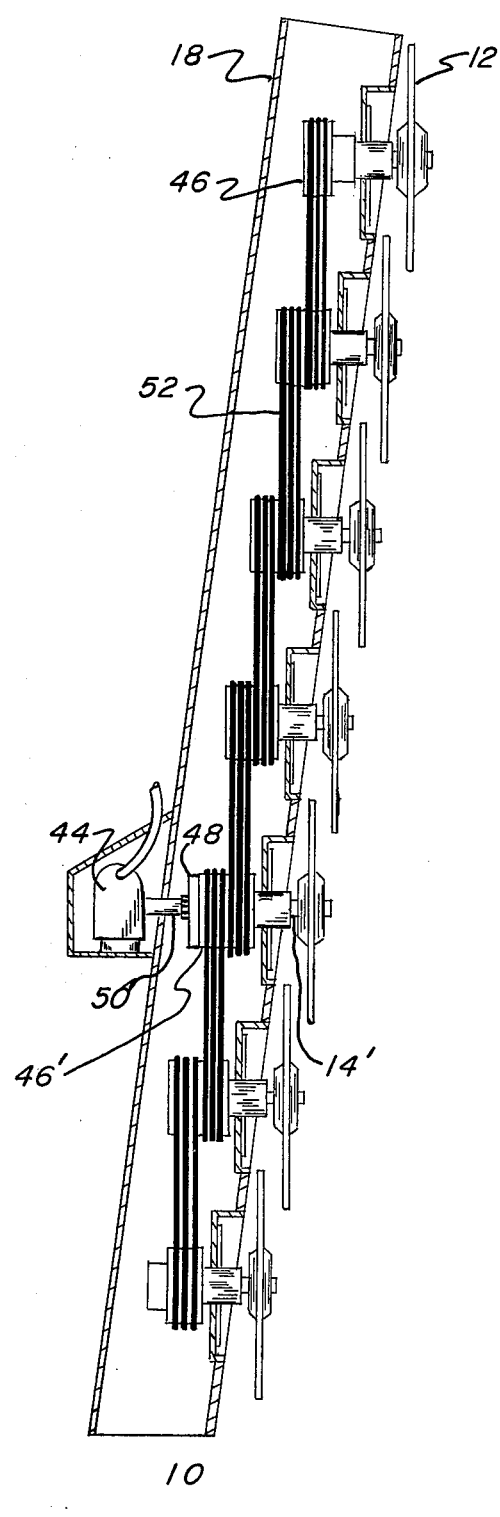

PRUNING BOOM

BACKGROUND OF THE INVENTION

This invention relates to a new and improved pruning boom for pruning or trimming trees, bushes, shrubs and the like. The pruning boom of the present invention is particularly suitable for use as a component of pruning machines of the type commonly used for citrus grove caretaking operations.

It is the general practice in the citrus industry to plant trees in relatively close-spaced parallel rows for maximum utilization of the acreage available to the grove owner. Citrus trees which are planted in relatively close-spaced parallel rows have a tendency to grow rapidly, and thereby, to fill the space between adjacent trees with dense vegetation. Of course, this dense vegetation shuts out sunlight and prevents passage of vehicles and other machines between adjacent rows of trees.

It is well known that the dense vegetation which grows between adjacent rows of citrus trees must be pruned or hedged periodically to maintain the health of the trees in the grove and to achieve normal fruit production for the grove. Furthermore, such periodic pruning or hedging is required to maintain open passageways between adjacent rows of trees in the grove. Such passageways are essential for normal citrus grove caretaking operations inasmuch as vehicles and other machines are used for cultivating, fertilizing, spraying and otherwise caring for the trees in the grove.

It is also well known that citrus trees often grow rapidly on top and take on what is sometimes referred to as wild growth. Periodic pruning or topping of such wild growth is necessary to maintain the health of the trees in the grove and to achieve normal fruit production for the grove. And, of course, such pruning or topping lowers the overall height of the trees in the grove for more convenient fruit harvesting operations.

Two general types of pruning machines, i.e. hedging machines and topping machines, are widely used in the citrus industry for mechanized tree pruning operations. Hedging machines are used for pruning the dense vegetation which grows between adjacent rows of trees. Topping machines are used for cutting the wild growth on the tops of trees. Pruning machines, such as the machine in U.S. Pat. No. 4,067,178, which are capable of both hedging and topping are known but are not widely used in the citrus industry.

The various pruning machines which are widely used in the citrus industry utilize pruning arms or booms having a plurality of rapidly rotating circular saw blades for cutting branches, limbs and other vegetation from the trees. In general, hedging machines utilize pruning booms which are positioned essentially vertically during operation and topping machines utilize pruning booms which are positioned essentially horizontally during operation. Often, topping machines are operated with their pruning booms positioned at slight angles from the horizontal to cut branches, limbs and other vegetation from the tops of the trees in a manner which causes the tree tops to have a somewhat pyramidal shape.

It has long been known that the cutting paths of the saw blades of known pruning machines must be overlapped in some manner during pruning operations if the trees are to be pruned uniformly. Various means for overlapping the cutting paths of the saw blades of pruning machines have been known for many years. For example, each of the pruning booms on the hedging and topping machine in U.S. Pat. No. 4,067,178 has a slight "dog leg" configuration which results in overlapping cutting paths for the saw blades during pruning operations. The hedging machine in U.S. Pat. No. 3,138,911 utilizes straight pruning booms having alternating peripherally overlapped saw blades. This saw blade configuration is widely used on pruning machines used in the citrus industry. Other means for overlapping the cutting paths of saw blades include the use of reciprocating pruning booms (U.S. Pat. No. 3,157,016), oscillating pruning booms (U.S. Pat. No. 3,214,895), and rotating saw carriers (U.S. Pat. Nos. 2,926,480 and Re. 26,793).

During pruning operations using pruning machines having known pruning booms, a significant number of the newly cut branches and limbs wedge between the rotating saw blades and the saw carrying member of the boom immediately after they are cut from the tree. Often, these branches and limbs are retained in their wedged positions for extended periods of time and impart substantial frictional forces to the rotating saw blades and their drive shafts. And, of course, increased rotational horsepower is required to overcome these frictional forces and maintain a constant rotational speed for the saw blades.

It is not uncommon for branches and limbs which are wedged between the rotating saw blades and the saw carrying member of known pruning booms to engage uncut branches and limbs on a tree, and, thereby, move such branches and limbs from the cutting paths of the advancing saw blades. Usually, such branches and limbs return to their original positions when the advancing saw blades have passed. When this occurs with significant frequency, a newly pruned citrus grove can be very unsightly. Furthermore, the protruding branches and limbs which remain on the pruned trees are often a nuisance, and occasionally a hazard, during subsequent caretaking and harvesting operations in the grove.

Many designers of pruning machines provide a rotating steel bar or beater on each of the drive shafts for the rotating saw blades of known pruning booms. When such beaters are used, they are mounted between the saw blades and the saw carrying member of the boom. The pruning machines in U.S. Pat. Nos. 3,157,016 and 3,214,895 utilize typical beaters, often called "limb knockers". While such beaters dislodge many of the newly cut branches and limbs which wedge between the rotating saw blades and the saw carrying member of the boom, they do not eliminate the problem. In fact, many designers and operators of pruning machines are of the opinion that the benefits obtainable from beaters do not compensate for their detriments. Longer drive shafts are required for the rotating saw blades when beaters are utilized. This increases bearing stresses and often causes severe wear on the bearing surfaces. And, of course, the beater and the longer drive shafts which are required for their use add significant weight to the pruning boom.

It is usually necessary for the operator of a pruning machine having known pruning booms to shut down the machine periodically during pruning operations for removal of branches and limbs which are wedged between the rotating saw blades and the saw carrying member of the boom. When the frequency of these shut downs is high, the resulting loss of pruning time can be very costly. And, of course, removal of wedged branches and limbs by the pruning machine operator exposes the operator to a substantial risk of personal injury inasmuch as such branches and limbs must be pulled from their positions between the rotating saw blades and the saw carrying member of the boom.

SUMMARY OF THE INVENTION

The present invention provides a pruning boom which overcomes many of the disadvantages inherent in known pruning booms. The advantages of the pruning boom of the present invention are best achieved when the boom is operated in an essentially vertical position. For that reason, the pruning boom of the present invention is particularly suitable for use with hedging machines for citrus grove caretaking operations. Nevertheless, the pruning boom of the present invention is suitable for use with topping machines, hedging-topping machines and other types of pruning machines. When used with any type of known pruning machine, the operational efficiency of the pruning boom of the present invention will be substantially greater than will be the case if known pruning booms are used with the particular machine type.

The circular saw blades of known pruning booms are rotated by drive shafts which are mounted perpendicular to the saw carrying member of the boom. Thus, with known pruning booms, the saw blades rotate in one or more spatial planes which are parallel to the spatial plane containing the saw carrying member. In contrast, the circular saw blades of the pruning boom of the present invention are rotated by drive shafts which are mounted at identical non-perpendicular angles to the saw carrying member of the boom. Thus, with the pruning boom of the present invention, the saw blades rotate in parallel spatial planes, each of which is positioned at an identical small angle to the spatial plane containing the saw carrying member.

In its preferred embodiment, one pruning boom of the present invention is mounted on each side of the front-end of a conventional agricultural vehicle to construct a hedging machine for citrus grove caretaking operations. With each such pruning boom, the distance between the uppermost point on the circumference of each circular saw blade and the saw carrying member is less than the distance between the lowermost point on the circumference of the same saw blade and said member. And, it will be readily appreciated that the distance between each saw blade and the saw carrying member gradually increases when moving from said uppermost point to said lowermost point along an axis through both of said points. To overlap the cutting paths of the circular saw blades of the pruning boom of the present invention, the saw blades are overlapped at their peripheries by positioning the uppermost portion of each blade behind the lowermost portion of the adjacent blade above it on the saw carrying member. The inventors refer to this saw blade configuration as the "step-lap" configuration.

During operation of the pruning boom of the present invention, each circular saw blade is rotated such that the cutting edges of its teeth move downward as the boom moves through the tree. For this reason, most newly cut branches and limbs are propelled in a generally downward direction and fall to the ground immediately after they are cut from the tree. Occasionally, newly cut branches and limbs find their way into the space between the rotating saw blade and the saw carrying member. Since the distance between the saw blade and the saw carrying member gradually increases in a generally downward direction and the saw blade is rotating in that direction, it is almost impossible for such branches and limbs to wedge between the saw blade and the saw carrying member. And, any branches and limbs which do wedge between the saw blade and the saw carrying member will continue to be forced in a generally downward direction as the saw blade rotates until they are free to fall to the ground. It will be readily appreciated that the pruning boom of the present invention eliminates branch and limb retention problems associated with known pruning booms without the use of beaters or "limb knockers".

These and many other advantages, features and objects of the present invention will be apparent from the following brief description of drawings, detailed description of the preferred embodiment and claims.

BRIEF DESCRIPTION OF THE DRAWINGS

FIG. 1 is a side elevational view of a pruning boom embodying concepts of the present invention.

FIG. 2 is a partial sectional view along line 2—2 in FIG. 1 illustrating the angular relationships between the saw blades and the saw carrying member of the boom.

DETAILED DESCRIPTION OF THE PREFERRED EMBODIMENT

The preferred embodiment of the pruning boom of the present invention is illustrated in FIGS. 1, 2, 3 and 4. In its preferred embodiment, the pruning boom of the present invention is used with hedging machines for citrus grove caretaking operations. However, pruning booms embodying concepts of the present invention can be constructed for use with topping machines, hedging-topping machines and other types of pruning machines.

Figure 3:
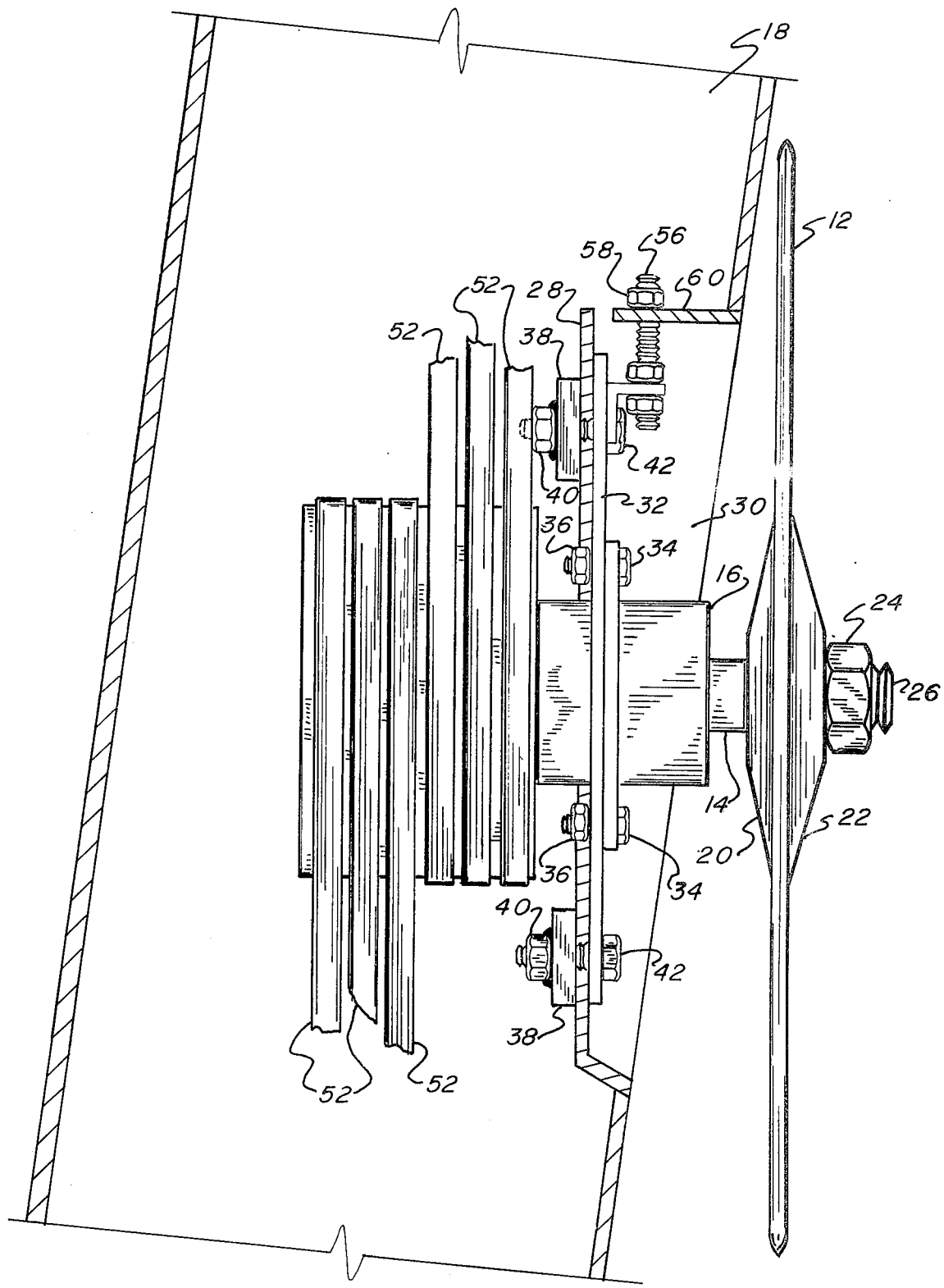
FIG. 3 is a partial sectional view of a typical circular saw blade operatively mouned on the saw carrying member of the pruning boom illustrated in FIGS. 1 and 2.

Referring to FIGS. 1 and 2, the pruning boom 10 comprises a plurality of circular saw blades 12, each fixed to one end of a drive shaft 14 rotatably positioned in the interior of a support bearing 16, a saw carrying member 18, and power means for rotating the drive shafts 14. Preferably, each saw blade 12 is fixed to its drive shaft 14 by fastening means which enable the blade 12 to be easily removed from its drive shaft 14 for periodic sharpening. Suitable fastening means, including a pair of collars 20 and 22 and an internally threaded lock nut 24, are illustrated in FIG. 3. The collars 20 and 22 position the saw blade 12 on its drive shaft 14 and provide support necessary to resist bending forces imparted to the saw blade 12 during pruning operations. The internal threads of the lock nut 24 engage external threads on the end 26 of the drive shaft 14 to secure the saw blade 12 and the collars 20 and 22 on the drive shaft 14. The lock nut 24 and the end 26 of the drive shaft 14 are appropriately threaded for tightening by rotating the lock nut 24 in a direction opposite to the direction of rotation of the drive shaft 14.

Each support bearing 16 is mounted on the saw carrying member 18 such that each drive shaft 14 is positioned for rotation at an identical non-perpendicular angle to the spatial plane generally comprising the surface of the saw carrying member 18 which is nearest to the rear surfaces of the saw blades 12. Thus, the saw blades 12 rotate in parallel spatial planes, each of which is positioned at an identical small angle to the spatial plane generally comprising said surface of the saw carrying member 18. Preferably, this is accomplished by providing a plurality of openings in said surface of the saw carrying member 18, a hollow, essentially rectangular structure. In each of these openings, a pair of plate-like runners 28 is welded to opposed interior surfaces 30 of the saw carrying member 18. The runners 28 are positioned perpendicular to the interior surfaces 30 and at an angle to the surface of the saw carrying member 18 containing the openings. If desired, two additional plate-like runners (not illustrated in the drawings) can be provided in the spatial plane containing the runners 28 in each opening to connect the runners 28 at their tops and bottoms.

A support bearing 16 is recessed in each of said openings by rigidly securing the support bearing 16 to a support plate 32 which slidably engages the runners 28. The support bearing 16 is rigidly secured to the support plate 32 by conventional means, such as positioning the support bearing 16 in a cylindrical opening through the center of the support plate 32 and fastening the support bearing 16 to the support plate 32 with bolts 34 and nuts 36. Four slide clamps, each comprised of a plate 38 having nut 40 welded to one surface and a headed bolt 42, are provided for securing the support plate 32 to the runners 28. The bolts 42 are passed through holes in the support plate 32 and the plates 38 and engage the nuts 40. It will be readily appreciated that this mounting means facilitates removal of the support bearing 16 if necessary for maintenance and repair. It will also be readily appreciated that the angle which is provided between the runners 28 and the surface of the saw carrying member 18 containing the openings fixes the angle between the saw blade 12 and the saw carrying member 18 and that these two angles are identical.

While various power means, including a plurality of conventional electric or hydraulic motors, can be used to rotate the drive shafts 14, it is preferable to have a single power means to rotate all of the drive shafts 14 for the pruning boom 10. Referring to FIG. 2, a conventional hydraulic motor 44 directly rotates one of the drive shafts 14'. As illustrated, the drive shaft 14' which is directly rotated by the motor 44 is the third drive shaft 14 from the bottomm of the vertical array of drive shafts 14. However, the motor 44 could be positioned to rotate either of the other drive shafts 14 if desired. Normally, one of the lower drive shafts 14 is selected to maintain a low center of gravity for the pruning boom 10 when used with a hedging machine.

Each of the drive shafts 14 are of equal length and each has a conventional six groove V-belt sheave 46 fixedly mounted on its end opposite the end carrying the saw blade 12. The sheave 46' on the drive shaft 14' has a flexible connection 48 which engages the output shaft 50 of the motor 44. As illustrated in FIGS. 2 and 3, each pair of adjacent sheaves 46 is interconnected by three conventional V-belts 52. Because of the angular relationship between the drive shafts 14 and the saw carrying member 18, each sheave 46 is slightly offset from the adjacent sheaves 46 above and below. For this reason, with each pair of sheaves 46, the three interconnecting V-belts 52 engage the innermost grooves on the lower sheave 46 and the outermost grooves on the upper sheave 46. If desired, the unused grooved sections of the top and bottom sheaves on the saw carrying member 18 of pruning boom 10 can be removed to eliminate unnecessary weight.

While V-belt tension can be adjusted by merely moving the support plates 32 on the runners 28, it is preferable to have a means for facilitating adjustment of V-belt tension. As illustrated in FIG. 3, an angular bracket 54 is fastened to each support plate 32 by conventional means, such as welding or a headless screw (not illustrated in the drawings). A bolt 56 having three adjustment nuts 58 passes through a hole through the angular bracket 54 and a hole through a fixed support member 60 positioned above the support plate 32. To adjust belt tension, the bolts 42 of the slide clamps securing the support plate 32 to the runners 28 are loosened to enable the support plate 32 to slide on the runners 28. Then, the adjustment nuts 58 are turned to loosen or tighten the V-belts 52, as required, and the bolts 42 are retightened to secure the support plates 32 to the runners 28. It will be readily appreciated that the above described combination of a motor 44, sheaves 46 fixed mounted on drive shafts 14 and V-belts 52 which interconnect adjacent pairs of sheaves 46 will effectively rotate all of the drive shafts 14, and thereby, rotate all of the saw blades 12 of the pruning boom 10.

The present invention is not limited by the number of saw blades 12 on the pruning boom 10, the diameter of each saw blade 12, or the spacing between adjacent drive shafts 14 for rotation of the saw blades 12. However, a pruning boom 10 having seven saw blades 12, each having a diameter of thirty-eight inches, with a distance of approximately thirty inches between adjacent drive shafts 14 has proved to be very effective for use with a hedging machine for citrus grove caretaking operations. With such a pruning boom 10, the peripheries of adjacent saw blades 12 are overlapped for a distance of approximately eight inches with the uppermost portion of each saw blade 12 in the vertical array being positioned behind the lowermost portion of the saw blade immediately above it in the array.

Figure 4:
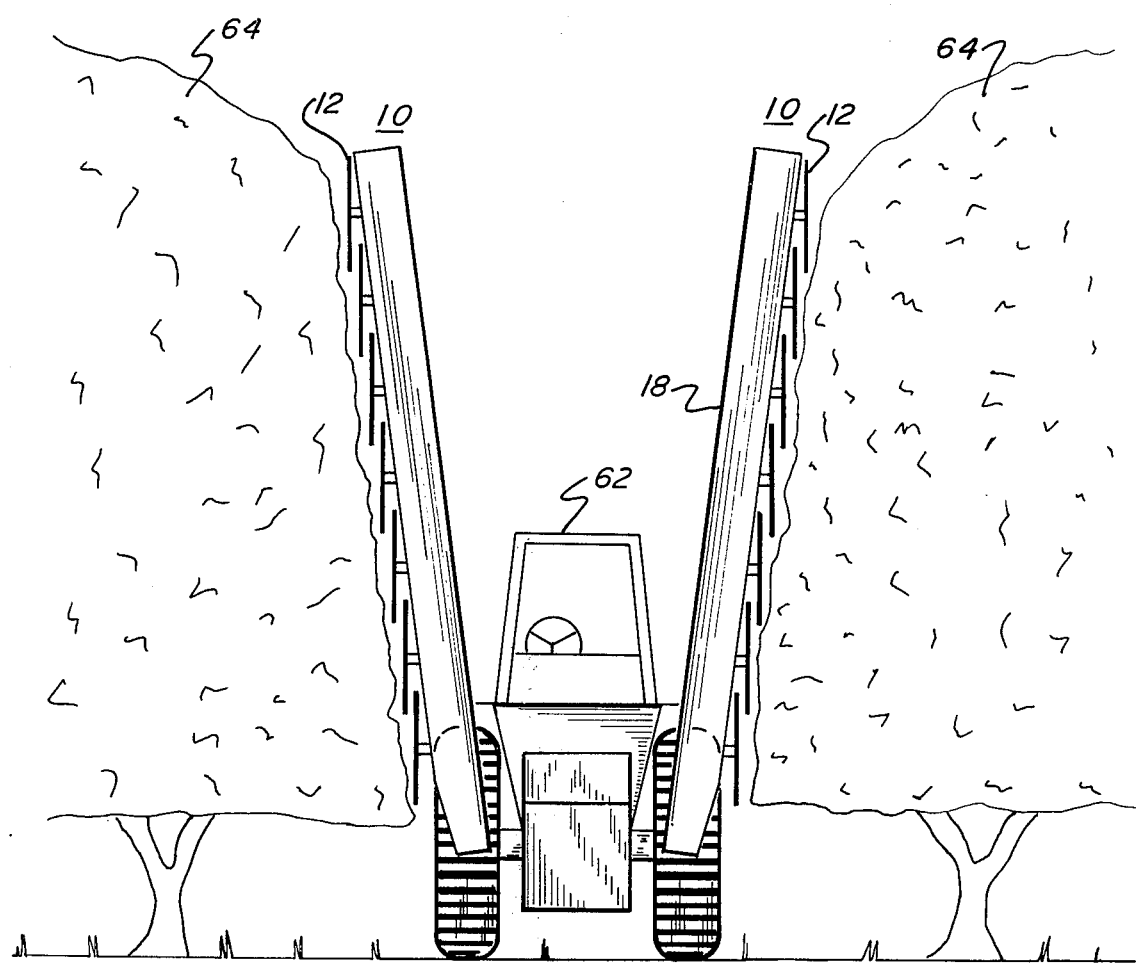
FIG. 4 is a front schematic view illustrating operation of a hedging machine with a pair of pruning booms embodying concepts of the present invention.

Having described the structure of the pruning boom 10, its operation will now be described. Referring to FIG. 4, one pruning boom 10 is mounted on each side of the front end of a conventional agricultural vehicle 62 to construct a hedging machine for citrus grove caretaking operations. While various types of agricultural vehicles can be used for this purpose, rubber tired vehicles, such as front-end loaders or logging vehicles, having articulated frames are preferred. Such vehicles are substantially easier to maneuver in a citrus grove during hedging operations without damaging the trees than tracked vehicles and rubber-tired vehicles having non-articulated frames. Preferably, a conventional hydraulic system (not illustrated in the drawings) is provided for moving the pruning booms 10 to adjust the hedging angle as desired. Normally, the pruning booms 10 are maintained in parallel, essentially vertical positions for hedging two parallel rows of citrus trees 64 as the vehicle 62 is driven along the rows. During such hedging operations, the saw blades 12 are rotated such that the cutting teeth on the leading edge of each saw blade 12 are moving downward as the saw blade 12 moves forward through the tree 64 which is being pruned.

During normal hedging operations, most of the newly cut branches and limbs are propelled in a generally downward direction by the rotating saw blades 12 and fall to the ground after they are cut from the tree 64. Occasionally, a branch or limb finds its way into the space between a rotating saw blade 12 and the surface of the saw carrying member 18. But, because of the above-described angular relationship between the saw blade 12 and the surface of the saw carrying member 18, it is almost impossible for the branch or limb to wedge itself tightly in that space. As the saw blade 12 rotates, such branches and limbs are forced in a generally downward direction, the direction of increase in the distance between the saw blade 12 and the surface of the saw carrying member 18, until they have been dislodged and fall to the ground. With the pruning boom 10 which has been described and illustrated, it is not necessary to provide beaters or "limb knockers" on the drive shafts 14 to accomplish the described results.

While the present invention has been disclosed in connection with the preferred embodiment thereof, it should be understood that there may be other embodiments, including, without limitation, pruning booms for topping machines, hedging-topping machines and other types of pruning machines, which fall within the spirit and scope of the invention as defined by the following claims.

We claim:

1. A pruning boom for pruning or trimming trees, bushes, shrubs and the like, comprising:
   (a) a saw carrying member;
   (b) a plurality of circular saw blades, each fixed to one end of a drive shaft rotatably positioned in a support bearing;
   (c) means for mounting said support bearings such that each of said circular saw blades is positioned for rotation in a spatial plane which intersects the spatial plane containing the surface of said saw carrying member located immediately behind said circular saw blades at an identical non-perpendicular angle; and
   (d) means for rotating said drive shafts.

2. A pruning boom as recited in claim 1, wherein the diameters of said circular saw blades are equal.

3. A pruning boom as recited in claim 1, wherein the centers of said circular saw blades are positioned at equal distances from the surface of said saw carrying member located immediately behind said circular saw blades.

4. A pruning boom as recited in claim 1, wherein the distances between the centers of adjacent support bearings are equal.

5. A pruning boom as recited in claim 1, wherein the distances between the centers of adjacent support bearings are less than the diameters of said circular saw blades such that said circular saw blades are overlapped at their peripheries with the uppermost portion of each blade positioned behind the lowermost portion of the adjacent blade above it on said saw carrying member.

6. A pruning boom as recited in claim 1, wherein the diameters of said circular saw blades are equal, the centers of said circular saw blades are positioned at equal distances from the surface of said saw carrying member located immediately behind said circular saw blades, the distances between the centers of adjacent support bearings are equal, and the distances between the centers of adjacent support bearings are less than the diameters of said circular saw blades such that said circular saw blades are overlapped at their peripheries with the uppermost portion of each blade positioned behind the lowermost portion of the adjacent blade above it on said saw carrying member.

7. A pruning boom as recited in claims 1, 2, 3, 4, 5 or 6, wherein said means for mounting said support bearings includes a plurality of openings in the surface of said saw carrying member located immediately behind said circular saw blades, each for recessing one of such support bearings; in each of said openings, a pair of plate-like runners welded perpendicular to opposite interior surfaces of said saw carrying member below the surface of said opening and at a non-perpendicular angle thereto; a plurality of support plates, each rigidly secured to one of said support bearings for slidably engaging one pair of said runners; and means for securing each of said support plates to one pair of said runners.

8. A pruning boom as recited in claims 1, 2, 3, 4, 5 or 6, wherein said means for rotating said drive shafts includes a motor positioned and connected for directly rotating one of said drive shafts; a plurality of multi-groove sheaves, each fixedly mounted on one of said drive shafts; and a plurality of belts interconnecting pairs of adjacent sheaves such that the belts which engage the innermost grooves on the lower sheave of each pair engage the outermost grooves on the upper sheave of the same pair.

* * * * *